(12) United States Patent
Valentino, III et al.

(10) Patent No.: US 11,734,958 B2
(45) Date of Patent: Aug. 22, 2023

(54) PREDICTING BEHAVIOR FROM SURVEILLANCE DATA

(71) Applicant: eConnect, Inc., Las Vegas, NV (US)

(72) Inventors: Henry Valentino, III, Las Vegas, NV (US); Jack Coronel, Las Vegas, NV (US)

(73) Assignee: eConnect, Inc., Las Vegas, NV (US)

( * ) Notice: Subject to any disclaimer, the term of this patent is extended or adjusted under 35 U.S.C. 154(b) by 0 days.

(21) Appl. No.: 14/745,348

(22) Filed: Jun. 19, 2015

(65) Prior Publication Data

US 2016/0371547 A1 Dec. 22, 2016

(51) Int. Cl.
G06V 40/20 (2022.01)
G06V 20/52 (2022.01)
H04N 23/90 (2023.01)

(52) U.S. Cl.
CPC .............. *G06V 40/20* (2022.01); *G06V 20/52* (2022.01); *H04N 23/90* (2023.01)

(58) Field of Classification Search
None
See application file for complete search history.

(56) References Cited

U.S. PATENT DOCUMENTS

| | | | | |
|---|---|---|---|---|
| 7,788,208 B2* | 8/2010 | Kobayashi | ............ | G06N 7/005 706/52 |
| 9,217,994 B2* | 12/2015 | Ainsley | ............ | G05B 13/02 |
| 9,501,793 B1* | 11/2016 | Edelman | ............ | G06Q 30/0641 |
| 10,068,218 B2* | 9/2018 | Abraham | ............ | G07G 1/14 |
| 2005/0222712 A1* | 10/2005 | Orita | ............ | G06Q 30/02 700/246 |
| 2009/0006295 A1* | 1/2009 | Angell | ............ | G06N 3/004 706/21 |
| 2009/0083122 A1* | 3/2009 | Angell | ............ | G06Q 10/0631 705/7.33 |
| 2011/0161136 A1* | 6/2011 | Faith | ............ | G06Q 30/0261 705/7.29 |
| 2013/0342346 A1* | 12/2013 | Hazzani | ............ | G08B 23/00 340/539.13 |
| 2014/0156347 A1* | 6/2014 | Agrawal | ............ | G06Q 30/0202 705/7.31 |
| 2014/0164046 A1* | 6/2014 | Haralambos | ............ | G06Q 30/06 705/7.25 |
| 2014/0372175 A1* | 12/2014 | Jain | ............ | H04W 76/12 705/7.31 |
| 2015/0073925 A1* | 3/2015 | Renfroe | ............ | G06Q 50/12 705/15 |

FOREIGN PATENT DOCUMENTS

EP 1610248 A2 * 12/2005 ............ G06Q 20/20

* cited by examiner

*Primary Examiner* — Shadan E Haghani
(74) *Attorney, Agent, or Firm* — Columbia IP Law

(57) ABSTRACT

Technologies and implementations for facilitating behavior prediction based on analysis of surveillance data are generally disclosed. The technologies and implementations include identification of subjects, associating the subjects with behavior, predicting future behavior of the subject, and providing a behavior influencing incentive to the subject.

24 Claims, 9 Drawing Sheets

800 A computer program product

802 A signal bearing medium

804 Machine-readable instructions that, when executed by one or more processors, operatively enable a device to:

analyze first surveillance data, the first surveillance data including video image data to facilitate identification of facial data and behavior data associated with a subject;

identify the subject based, at least in part, on the facial data;

identify a behavior associated with the subject based, at least in part, on the behavior data;

associate the subject and the behavior with an identifier in a database; and predict a future behavior to be executed by the subject based, at least in part, on the identified behavior.

| 806 a computer-readable medium | 806 a recordable medium | 806 a communications medium |

FIG. 8

1000 A computer program product

1002 A signal bearing medium

1004 Machine-readable instructions that, when executed by one or more processors, operatively enable a device to:

analyze first surveillance data at a merchant, the first surveillance data including video image data to facilitate identification of facial data and behavior data associated with a subject visiting the merchant;

identify the subject based, at least in part, on the facial data, the facial data being available to the merchant;

identify a behavior associated with the subject based, at least in part, on the behavior data while visiting the merchant;

associate the subject and the behavior with an identifier in a database, the database being available to the merchant;

predict a future behavior to be executed by the subject based, at least in part, on the identified behavior; and determine supplies for the merchant based, at least in part, on the predicted future behavior to be executed by the subject while visiting the merchant.

| 1006 a computer-readable medium | 1006 a recordable medium | 1006 a communications medium |

FIG. 10

PREDICTING BEHAVIOR FROM SURVEILLANCE DATA

INFORMATION

Unless otherwise indicated herein, the approaches described in this section are not prior art to the claims in this application and are not admitted to be prior art by inclusion in this section.

Video surveillance cameras have become a ubiquitous presence in the world. However, surveillance cameras are typically used as a crime deterrent and for other security purposes. Image data from surveillance cameras is not mined for commercial purposes.

SUMMARY

Described herein are various illustrative methods for tracking facial data associated with a subject in first image data. The example methods may include analyzing first surveillance data, the first surveillance data including video data to facilitate identification of facial data and behavior data associated with a subject, identifying the subject based, at least in part, on the facial data, identifying a behavior associated with the subject based, at least in part, on the behavior data, associating the subject and the behavior with an identifier in a database, and predicting a future behavior to be executed by the subject based, at least in part, on the identified behavior.

The present disclosure also describes various example article of manufacture having a non-transitory machine readable medium having stored therein a number of instructions that, when executed by a processors, operatively enable a computing device to analyze first surveillance data, the first surveillance data including video image data to facilitate identification of facial data and behavior data associated with a subject, identify the subject based, at least in part, on the facial data, identify a behavior associated with the subject based, at least in part, on the behavior data, associate the subject and the behavior with an identifier in a database, and predict a future behavior to be executed by the subject based, at least in part, on the identified behavior.

The present disclosure additionally describes example devices that include a processor and a surveillance data analysis module (SDAM) communicatively coupled to the processor, the SDAM configured to identify a subject in a database based, at least in part, on facial data received in first surveillance data, identify one or more behaviors based, at least in part, on behavior data received in the first surveillance data, map the one or more pattern of behaviors to the subject based, at least in part, on the facial data, identify a pattern of behavior associated with the subject based, at least in part, on the mapped one or more behaviors, and predict a future behavior to be executed by the subject based, at least in part, on the pattern of behavior.

The present disclosure additionally describes example methods of predicting an action by a person, comprising sending surveillance data to an SDAM to be analyzed, wherein the surveillance data comprises facial data and behavior data, capturing context data and sending context data to the SDAM to be analyzed with the surveillance data to identify a subject and behavior patterns associated with the subject.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

In the Drawings

FIG. 8 illustrates an example computer program product, arranged in accordance with at least some embodiments described herein;

FIG. 10 illustrates an example computer program product 1000, arranged in accordance with at least some embodiments described herein.

DETAILED DESCRIPTION

Figure 1:
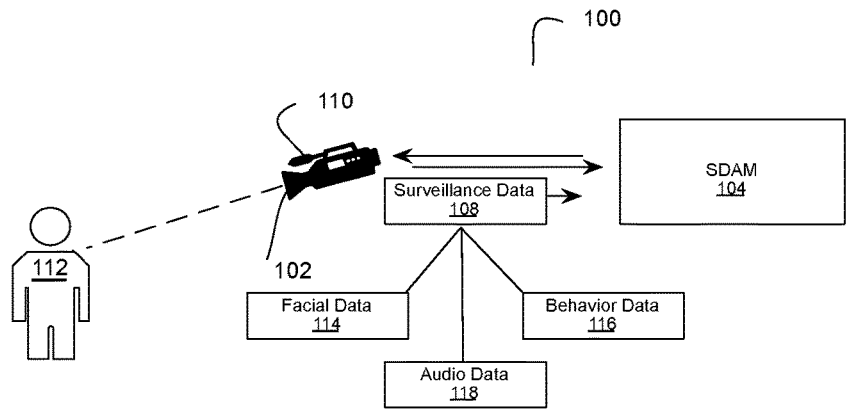
FIG. 1 illustrates an example system for predicting behavior based, at least in part, on surveillance data, in accordance with various embodiments.

The following description sets forth various examples along with specific details to provide a thorough understanding of claimed subject matter. It will be understood by those skilled in the art, however that claimed subject matter may be practiced without some or more of the specific details disclosed herein. Further, in some circumstances, well-known methods, procedures, systems, components and/or circuits have not been described in detail in order to avoid unnecessarily obscuring claimed subject matter.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, apparatus, and systems related to facilitating predicting behavior based, at least in part, on facial recognition in image data. Based, at least in part, on the facial recognition, the disclosure further is drawn to artificial intelligent learning of predictive behavior of a person. In one example, the person may be a consumer, who may interact with a merchant.

Video surveillance has become commonplace. In fact, it may be difficult to conduct routine daily business and/or leisure activities without being recorded on video at one or more locations. Private citizens, governmental institutions and/or businesses may record image data for a variety of reasons. Private citizens may record video to ensure personal safety and private property security. Governmental agencies may record video to ensure safety of the citizenry and to ensure compliance with various regulations (e.g., speed limits and other traffic rules). Businesses that deal with the public typically have at least one or more video recording device located at or near where business transactions take place, such as, at or near a point of sale (POS) device. Similarly, gambling establishments (e.g., casinos), financial establishments (e.g., banks), department stores and other commercial businesses may also position video recording devices at other locations (e.g., doors, teller windows, gambling tables, jewelry counters etc.) within a business to act as a deterrent to illegal activities and/or to provide a record of illegal activities taking place on the business premises.

As video technology has become more sophisticated, more and more video recordings may include digital data. Accordingly, video recordings may also be commonly referred to image data.

There is a great deal of interest in predicting consumer behavior. Many businesses may have a loyalty program that rewards consumers with incentives in exchange for permitting the business to access a record of the consumer's identity and/or purchases. Such loyalty programs allow the business to provide coupons and other incentives to consumers based, at least in part, on the consumer's purchase history. There may be vast amounts of image data generated by private citizens, governmental institutions and businesses. If accessible, such image data may be analyzed to identify consumers (e.g., using facial recognition techniques) and their actions. Predictions about future consumer behavior may be made based, at least in part, on the analysis of the image data.

FIG. 1 illustrates an example system for predicting behavior based, at least in part, on surveillance data, in accordance with various embodiments. Shown in FIG. 1, a system 100 may comprise a camera 102 communicatively coupled to a surveillance data analysis module (SDAM) 104. SDAM 104 may be disposed in camera 102 or may be remote and communicatively coupled to camera 102 via a wire line and/or wireless communication system. Camera 102 may comprise a wide variety of imaging devices. Such imaging devices may include, an analog type video camera, a video device utilizing charge-coupled devices (CCD), a video device utilizing complementary metal-oxide semiconductor (CMOS), a thermal imaging device, a near-infrared imaging device, or the like, and any combination thereof. Camera 102 may include a microphone 110 for recording audio.

In one example, camera 102 may be disposed at a vantage point such that camera 102 may provide surveillance of a particular area within the field of view of camera 102. Camera 102 may record images and/or audio of one or more subjects 112 participating in various activities such as engaging in a transaction at a point of sale (POS) device, entering or leaving a location, browsing merchandise, or the like, and/or any combination thereof. The term "subject" used herein may be interchangeable with and may refer to a person whose image may be captured by a camera, such as camera 102. Camera 102 may be configured to capture one or more images that include facial features of subject 112 and/or behavior associated with subject 112. Behavior associated with subject 112 may include spatial events and/or audio events corresponding to subject 112. Such spatial events may include actions executed by subject 112 such as stopping, walking, running, lifting an object, inspecting an object, handing an object to another party, or the like, and/or any combination thereof. In one example, SDAM 104 may analyze the surveillance data 108 to identify behaviors executed by subject 112 and may associate the identified behaviors with an identifier corresponding to subject 112. Behaviors such as making a purchase, entering a store, leaving a store, browsing merchandise, playing a video game, eating, gambling, exercising, working, etc. may be inferred from an analysis of motions executed by a subject in the image data. In another example, the motions recorded may be correlated with other contextual factors to make such inferences. The images and/or audio recorded by camera 102 may be stored as surveillance data 108. Camera 102 may send surveillance data 108 to SDAM 104 for analysis.

In one example, SDAM 104 may be configured to receive surveillance data 108 from camera 102 and may perform video content analytics (VCA) on the surveillance data 108. In another example, SDAM 104 may be configured to detect and identify facial data 114, behavior data 116 or audio data 118, and/or any combination thereof based, at least in part, on the VCA. The VCA may include a variety of algorithms, applications and/or programs in hardware, firmware and/or software. VCA may be configured to detect audio, facial features, and/or spatial events corresponding to behavior. SDAM 104 may perform VCA including, audio analysis, facial recognition, shape recognition, motion detection, ego-motion estimation, object detection, video tracking, etc., and/or any combination thereof.

In an example, facial data 114 may comprise any data associated with the subject's face. SDAM 104 may detect facial data 114 based, at least in part, on any of a variety of VCA techniques for identifying facial data 114. SDAM 104 may use detected facial data 114 to identify subject 112 based, at least in part, on facial recognition techniques such as, but not limited to, detection of various unique identifying aspects of the subject's face. SDAM 104 may associate facial data 114 with subject 112 in a database based, at least in part, on the identification.

In one example, behavior data 116 may comprise data associated with a physical and/or spatial event. SDAM 104 may identify behavior data 116 associated with subject 112 based, at least in part, on a variety of video content analysis (VCA) techniques for identifying behavior data 116. For example, SDAM 104 may identify behavior data 116 using VCA such as, but not limited to, shape detection and/or motion detection to identify temporal and/or spatial events such, but not limited to, as an action executed by subject 112. SDAM 104 may infer an association between behavior data 116 and subject 112 based, at least in part, on facial data 114. For example, SDAM 104 may determine that behavior data 116 detected proximate in time and/or space to facial data 114 that may be associated with subject 112 may also be associated with subject 112. Accordingly, an action executed by subject 112 such as picking up a piece of merchandise may be identified as behavior data 116 and may be attributed to subject 112. SDAM 104 may associate the behavior data 116 with subject 112 in a database based, at least in part, on facial data 114. The identification may be anonymous, where the subject may be identified by a unique ID without personal information associated with the identification. Alternatively, personal information may be associated with the identification of subject 112. Personal information may be obtained through purchase records of transactions associated with subject 112, subscription programs, loyalty programs, etc., and/or any combination thereof.

In one example, SDAM 104 may identify audio data 118 associated with subject 112 based, at least in part, on a variety of audio analytic and/or VCA techniques for identifying audio data 118. SDAM 104 may identify a direction and/or audio signature of detected audio data 118. SDAM 104 may determine that audio data 118, which may be proximate in time and/or space to facial data 114 and may be associated with subject 112 may also be associated with subject 112. Alternatively, SDAM may identify an audio signature in audio data 118 that may be associated with subject 112. For example, where audio data 118 and subject 112 have been associated in the past or where subject 112 provides an audio sample from which a signature can be detected. Accordingly, camera 102 may pick-up audio of subject 112 speaking which may be identified as audio data 118 and may be attributed to subject 112 based, at least in part, on a known signature and/or other audio analytics. SDAM 104 may associate the audio data 118 with subject 112 in a database.

In one example, SDAM 104 may be configured to identify a pattern of behavior corresponding to subject 112 based, at least in part, on the VCA and/or audio analytics. SDAM 104 may be configured to predict a future behavior of the subject based, at least in part, on the pattern of behavior. For example, SDAM 104 may capture video of subject 112 purchasing a newspaper and then purchasing a cup of coffee. SDAM 104 may identify subject 112 based, at least in part, on facial data 114 and identify the behavior based, at least in part, on behavior data 116. SDAM 104 may index the behaviors a) buying a newspaper and b) buying a cup of coffee based, at least in part, on behavior data 116 associated with facial data 114. SDAM 104 may infer a pattern of behavior based, at least in part, on the indexed behaviors. SDAM 104 may predict that subject 112 may buy coffee the next time SDAM 104 detects subject 112 purchasing a newspaper. SDAM 104 may take an action based, at least in part, on the prediction such as, but not limited to, offering SDAM 104 a coupon for coffee at the point of sale device used when the purchase of the newspaper is made. SDAM 104 may comprise a wide variety of computer program products, which may be included in a wide variety of computing devices such as, but not limited to camera 102, desktop computing devices, server type computing devices, handheld computing devices, tablets, smart phones, wearable smart devices, or the like, and/or any combination thereof.

Figure 2:
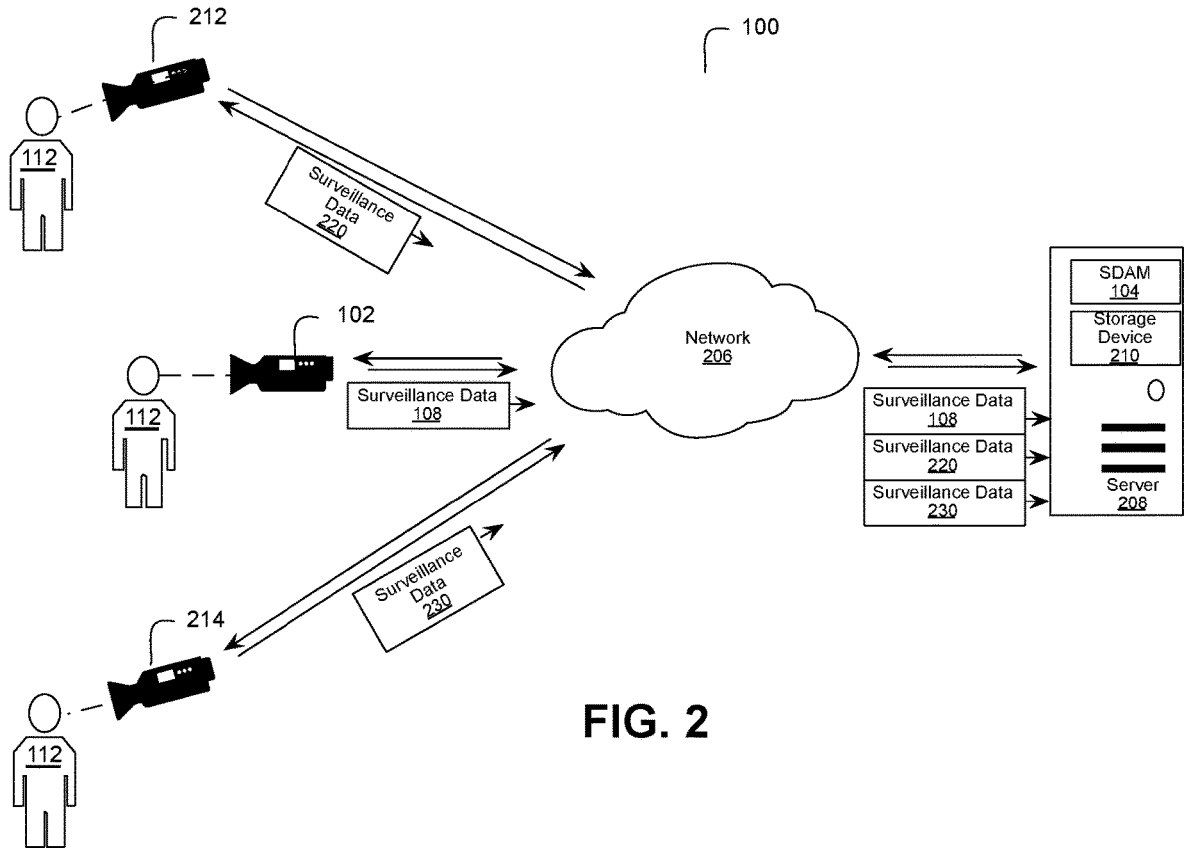
FIG. 2 illustrates an example system for predicting behavior based, at least in part, on surveillance data, in accordance with various embodiments.

FIG. 2 illustrates an example system for predicting behavior based, at least in part, on surveillance data, in accordance with various embodiments. System 100 may include camera 102, camera 212 and/or camera 214 communicatively coupled to server 208 via network 206. Cameras 102, 212 and/or 214 may be disposed in different geographical locations, in or near a same geographical location, in various locations throughout a particular building or outdoor location, or the like, and/or any combination thereof. Cameras 102, 212 and/or 214 may be standalone imaging and/or audio recording devices or may be devices that include image and/or audio recording functionality such as registers, kiosks, computing devices (e.g., desktop computing devices, handheld computing devices, tablets, smart phones, wearable smart devices including glasses, clothing, and the like), various imaging devices including thermal, digital or analog imaging devices, etc., and/or any combination thereof.

In one example, SDAM 104 may be configured to receive at least one of surveillance data 108 from camera 102, surveillance data 220 from camera 212 or surveillance data 230 from camera 214, or any combinations thereof. Cameras 102, 212 and/or 214 may be communicatively coupled to server 208 via a wire line and/or a wireless communication network 206. Network 206 may include a variety of networks. Such networks may include, the Internet, World Wide Web, a ubiquitous computing (ubicomp) environment, cloud computing system, Local Area Network (LAN), a Virtual Private Network (VPN), a Wireless Local Area Network (WLAN), a Wide Area Network (WAN), a Personal Area Network (PAN), or the like, and/or any combination thereof.

In one example, SDAM 104 may be coupled to a storage device 210. Storage device 210 may be disposed in SDAM 104 or may be a separate device. Storage device 210 may include a database. Storage device 210 may be configured to store a variety of data including, surveillance data 108, surveillance data 220, surveillance data 230, metadata related to surveillance data 108, an identifier associated with subject 112, context data, or the like, and/or any combination thereof. Storage device 210 may store data in a variety of data structures known to those of skilled in the art including, trees, hierarchical data structures, maps, lists, sets, arrays, hashes, etc., and/or any combination thereof. Storage device 210 may comprise a wide variety of storage types such as, but not limited to, mechanical, optical, electrical, etc., and/or any combination thereof. Additionally, storage device 210 may include machine readable instructions.

SDAM 104 may be configured to receive surveillance data 108 from camera 102, surveillance data 220 from camera 212, and/or surveillance data 230 from camera 214. In one example, camera 102 may capture surveillance data 108 at a first time, camera 212 may capture surveillance data 220 at a second time, and/or camera 214 may capture surveillance data 230 at a third time. The first, second, and third times may all be different times and may be captured consecutively or with a gap in time between each recording of surveillance data 108, surveillance data 220, and/or surveillance data 230.

SDAM 104 may perform audio analysis and/or video content analysis on one or more of surveillance data 108, surveillance data 220, and/or surveillance data 230. SDAM 104 may identify subject 112 based, at least in part, on facial data in one or more of surveillance data 108, surveillance data 220, and/or surveillance data 230. SDAM 104 may index behaviors associated with subject 112 based, at least in part, on behavior data in one or more of surveillance data 108, surveillance data 220, and/or surveillance data 230. SDAM 104 may identify audio associated with subject 112 based, at least in part, on audio data in one or more of surveillance data 108, surveillance data 220, and/or surveillance data 230. SDAM 104 may identify a pattern of behavior associated with subject 112 based, at least in part, on facial data, behavior data and/or audio data communicated in surveillance data 108, surveillance data 220, and/or surveillance data 230. SDAM 104 may be configured to predict a future action by subject 112 based, at least in part, on the pattern of behavior. In one example, SDAM 104 may be configured to associate in storage 210 a unique identifier (UID) with subject 112 and/or with a record of identified behaviors, context data and/or audio data.

Figure 3:
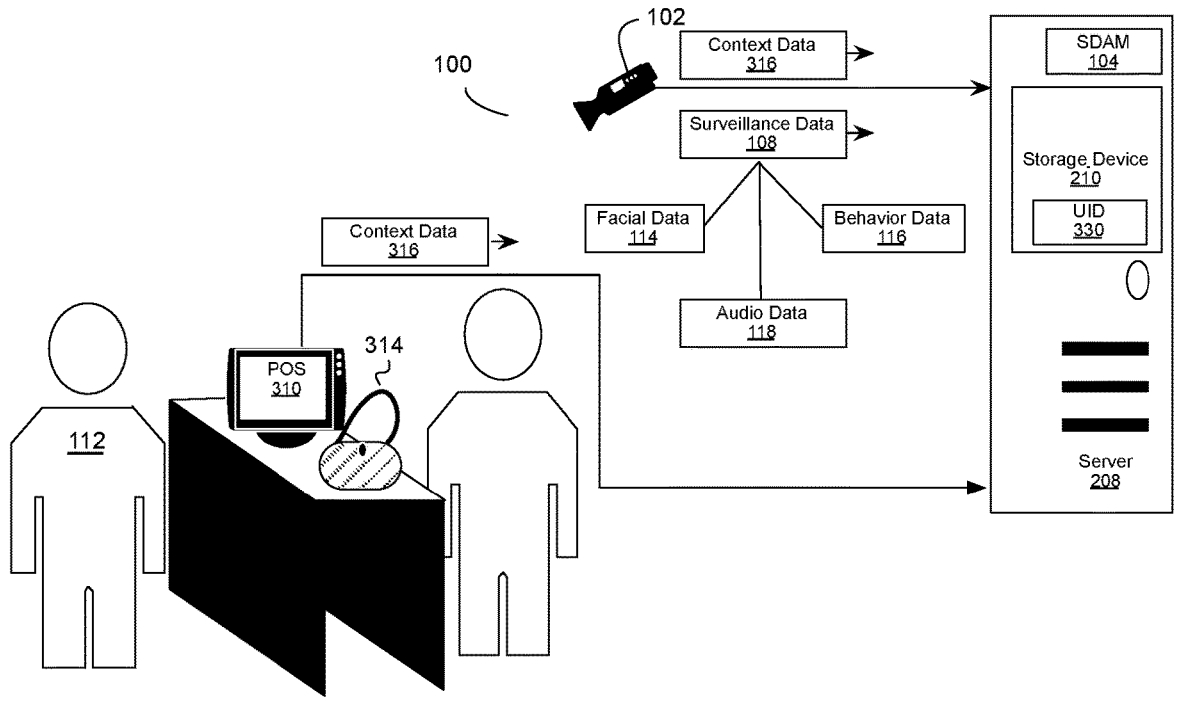
FIG. 3 illustrates an example system to facilitate predicting behavior based, at least in part, on surveillance data.

FIG. 3 illustrates an example system for predicting behavior based, at least in part, on surveillance data, in accordance with various embodiments. System 100 may include camera 102 positioned near a point of sale (POS) device 310 from a viewpoint enabling camera 102 to capture images of subject 112 making a purchase. In this example, subject 112 may be buying a purse 314. Camera 102 may record the purchase and capture surveillance data 108. Surveillance data 108 may include audio, facial data 114 and/or behavior data 116. Camera 102 may be configured to capture and/or generate context data 316. POS device 310 may be configured to capture and/or generate context data 316. Context data 316 may include metadata such as a camera location, camera ID, time, date, item(s) purchased, time of day, day of the week and/or year, type of establishment in which camera 102 is located, weather information, season, a location, a date, a time, a transaction type, a cost, a product, a service, a weather condition, a duration of visit, a speed, a direction of travel, an entrance, an exit, or a gender etc., and/or any combination thereof. In one example, SDAM 104 may be disposed in server 208 and may be in communication with camera 102. Camera 102 may send SDAM 104 surveillance data 108. Camera 102 and/or POS device 310 may send SDAM 104 context data 316 via a wireless and/or wire line communication medium. Communication may be over a network.

SDAM may receive and analyze surveillance data 108 and/or context data 316. Analytics performed by SDAM 104 may include a variety of VCA including, audio analysis, facial recognition, shape recognition, motion detection, egomotion estimation, object detection, video tracking, or the like, and/or any combination thereof. SDAM 104 may identify subject 112 and index behavior data 116 based, at least in part, on the analytics. In an example, SDAM 104 may generate a unique identifier (UID) 330 and associate UID 330 with subject 112. SDAM 104 may store UID 330 in a database in storage device 210. SDAM 104 may associate identified facial data 114 with subject 112. SDAM 104 may associate the indexed behavior data 116 with subject 112 based, at least in part, on the facial data 114. SDAM 104 may be configured to associate context data 316 with subject 112 based, at least in part, on audio data 118, facial data 114 and/or behavior data 116. SDAM 104 may associate behavior data 116 with context data 316 to show a relationship of the indexed behavior data 116 to a particular context.

As depicted in FIG. 3, camera 102 may capture images of subject 112 buying a purse on Feb. 6, 2016 after 5:00 pm during rainy weather. In this example, SDAM 104 may receive surveillance data 108 showing the purchase and/or context data 316 identifying the location of the purchase, the item purchased, the date, the time of day and the weather. SDAM 104 may then identify subject 112 based, at least in part, on facial data 114 from surveillance data 108. SDAM 104 may identify the behavior data 116 and index (or categorize) the behavior as a "purchase activity" based, at least in part, on behavior data 116 and/or context data 316. SDAM 104 may be configured to identify the object purchased as a purse based, at least in part, on behavior data 116 (e.g., using object recognition) and/or context data 316 (e.g., using metadata from POS device 310 identifying the item purchased). In one example, SDAM 104 may associate the behavior "purchase activity" with subject 112 based, at least in part, on facial data 114. SDAM 104 may associate the date, Feb. 6, 2016 with behavior data 116 and/or subject 112 based, at least in part, on the context data 316.

In one example, SDAM 104 may perform analytics on surveillance data 108 and/or context data 316 to identify one or more patterns of behavior corresponding to subject 112. For example, SDAM 104 may determine that purchasing purse 314 on February 6 may be a behavior pattern to be associated with subject 112. In another example, SDAM 104 may determine that purchasing purse 314 on a rainy day after 5:00 pm may be a behavior pattern that may be associated with subject 112. SDAM 104 may take an action based, at least in part, on the behavior pattern. For example, SDAM 104 may send POS device 310 a coupon for a purchase of a purse to be redeemed on the next rainy day or Feb. 6, 2016 based, at least in part, on the pattern of behavior.

Figure 4:
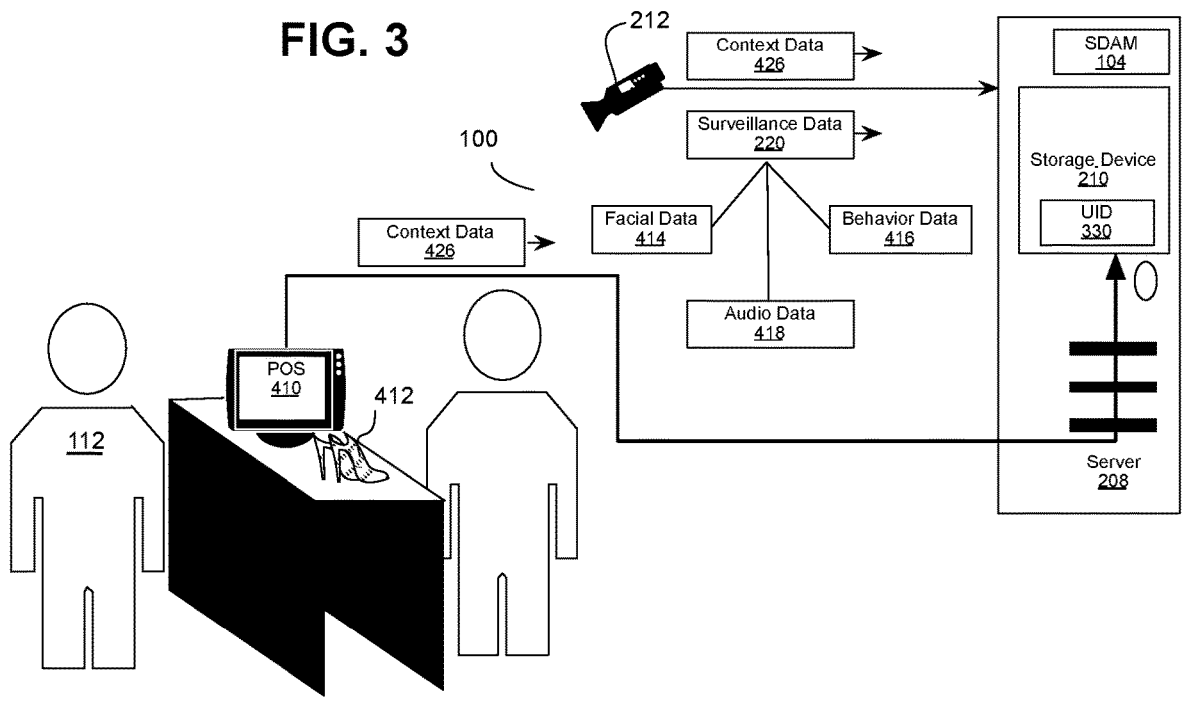
FIG. 4 illustrates an example system for predicting behavior based, at least in part, on surveillance data.

FIG. 4 illustrates an example system for predicting behavior based, at least in part, on surveillance data, in accordance with various embodiments. Shown in FIG. 4, system 100 includes camera 212 disposed in a different geographical location from camera 102. For example, camera 102 may be in a first store and camera 212 may be in a second store or cameras 102 and 212 may be disposed in different merchandise departments of the same store, or the like, and/or any combination thereof.

In one example, camera 212 may be positioned near a POS device 410 from a viewpoint enabling camera 212 to capture images of subject 112 making a purchase. Depicted in FIG. 4, subject 112 is buying a pair of shoes 412. Camera 212 may record the purchase and capture surveillance data 220. Surveillance data 220 may include audio 418, facial data 414 and/or behavior data 416. Camera 212 may be configured to capture and/or generate context data 426. POS device 410 may be configured to capture and/or generate context data 426. In another example, SDAM 104 may be disposed in server 208 and may be in communication with camera 212. Camera 212 may send SDAM 104 surveillance data 220. Camera 212 and/or POS device 410 may send SDAM 104 context data 426 via a wireless and/or wire line communication medium. Communication may be over a network.

In an example, SDAM 104 may receive and analyze surveillance data 220 and/or context data 426. SDAM 104 may perform analytics on surveillance data 220 and context data 426. SDAM 104 may associate identified facial data 414 with subject 112, identify subject 112 and index behavior data 416 based, at least in part, on the analytics. In one example, SDAM 104 may associate subject 112 with UID 330. SDAM 104 may associate the indexed behavior data 416 with subject 112 based, at least in part, on facial data 414. SDAM 104 may be configured to associate context data 426 with subject 112 based, at least in part, on facial data 414, behavior data 416 and/or audio data 418. SDAM 104 may associate behavior data 416 with context data 426 to show a relationship of the indexed behavior data 416 to a particular context.

Illustrated in FIG. 4, camera 212 may capture images of subject 112 buying a pair of shoes 412 on Feb. 6, 2016 after purchasing the purse 314 (as depicted in FIG. 3). SDAM 104 may receive surveillance data 108 showing the purchase and/or context data 316 identifying the item purchased, the date, the time of day and/or the weather. SDAM 104 may identify subject 112 based, at least in part, on facial data 414 from surveillance data 220. SDAM 104 may identify the behavior data 416 and index the behavior as a "purchase activity" based, at least in part, on behavior data 416 and/or context data 316. SDAM 104 may be configured to identify the object purchased as shoes 412 based, at least in part, on behavior data 416 (e.g., using object recognition) and/or context data 316 (e.g., metadata from POS device 310 identifying item purchased). SDAM 104 may associate the behavior "purchase activity" with subject 112 based, at least in part, on facial data 114. SDAM 104 may associate the date, Feb. 6, 2016 with behavior data 416 and/or subject 112 based, at least in part, on the context data 426. In one example, SDAM 104 may perform analytics on surveillance data 220 and/or context data 426 to identify one or more patterns of behavior corresponding to subject 112. For example, SDAM 104 may determine that purchasing shoes 412 after purchasing purse 314 on a rainy day may be a behavior pattern to be associated with subject 112. In another example, SDAM 104 may determine that purchasing shoes 412 on February 6 after 5:00 p.m. may be a behavior pattern to be associated with subject 112. SDAM 104 may take an action based, at least in part, on the behavior pattern. For example, SDAM 104 may send POS device 310 a coupon for a purchase of a purse to be redeemed on the next rainy day or Feb. 6, 2016 based, at least in part, on the pattern of behavior.

Figure 5:
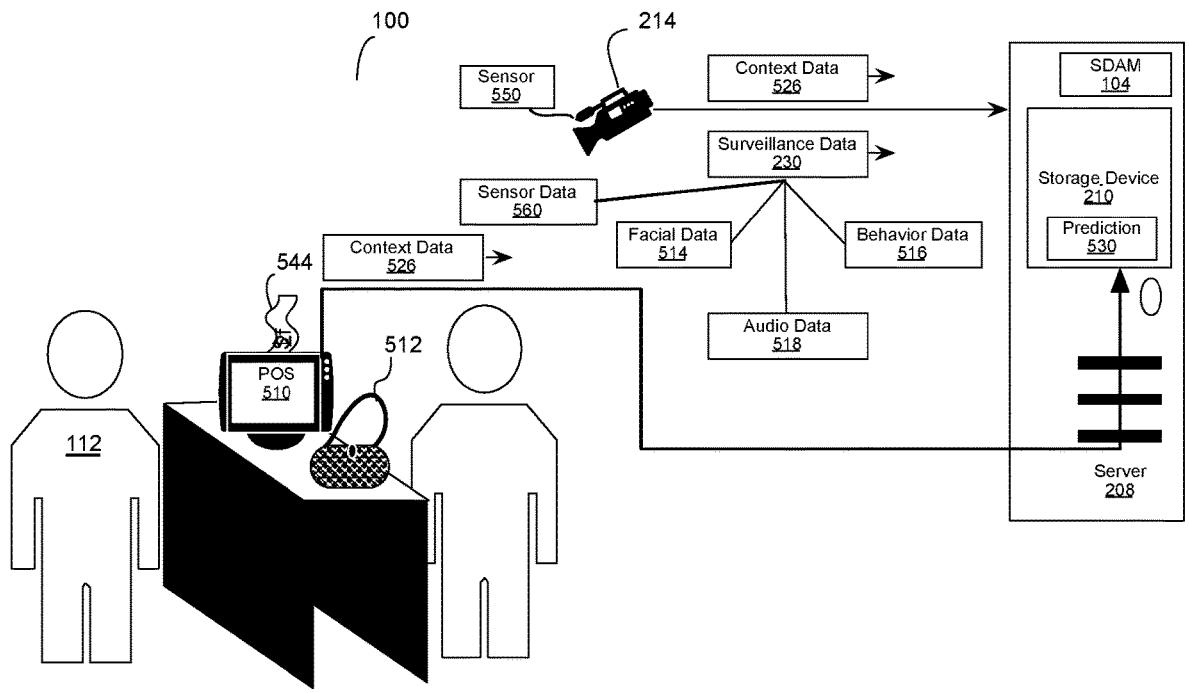
FIG. 5 illustrates an example system for predicting behavior based, at least in part, on surveillance data.

FIG. 5 illustrates an example system for predicting behavior based, at least in part, on surveillance data, in accordance with various embodiments. Shown in FIG. 5, system 100 may include camera 214 disposed in a different geographical location from camera 102 and/or camera 212. For example, camera 102 may be in a first store, camera 212 may be in a second store and camera 214 may be in a third store.

In one example, camera 214 may be positioned near a POS device 510 from a viewpoint enabling camera 214 to capture images of subject 112 making a purchase. Depicted in FIG. 5, subject 112 may be buying a purse 512. Camera 214 may record the purchase and capture surveillance data 230 and may generate context data 526. POS device may generate context data 526. Surveillance data 230 may include audio 518, facial data 514 and/or behavior data 516. Camera 214 may send SDAM 104 surveillance data 230 and/or context data 526 for analysis. POS device 510 may send context data to SDAM 104 for analysis.

In one example, SDAM 104 may receive surveillance data 230 and/or context data 526. Receipt of surveillance data 230 and/or context data 526 may trigger SDAM 104 to analyze surveillance data 230 and/or context data 526 via audio analysis and/or VCA. Such analysis may identify subject 112. SDAM may access a record in storage device 210 associated with subject 112. Such a record may include an identified pattern of behavior. SDAM may predict a future behavior based, at least in part, on surveillance data 230 based, at least in part, on the identified pattern of behavior and may take an action based, at least in part, on the prediction. For example, subject 112 may be shopping on Feb. 6, 2016 (perhaps it is the birthday of the subject 112). A pattern of behavior associated with subject 112 may indicate that subject 112 may purchase a purse on February 6 and proceed to purchase a purse. SDAM 104 may predict that subject 112 may be likely to be in the mood to purchase a pair of shoes based, at least in part, on the surveillance data 230 showing subject 112 purchasing purse 512 and/or based, at least in part, on context data 526 indicating that the date is February 6. Responsive to the prediction, SDAM 104 may generate prediction data 530 and may send POS device 510 a command 540 based, at least in part, on prediction data 530 triggering POS device 510 to print a coupon 544 for a purchase of a pair of shoes to provide to subject 112.

In one example, surveillance data 230 may comprise sensor data 560. In another example, one or more sensors 550 may be positioned throughout an area where behavior and facial data is to be gathered. A sensor 550 may be a microphone, heat sensor, optical sensor, infrared (IR) sensor, chemical sensor, pressure sensor, and the like, and/or any combination thereof. The one or more sensors 550 may be disposed any location. A sensor 550 may be configured to sense various physical phenomenon such as touch, heat, sound, smell, electromagnetic radiation, infrared radiation, etc., and/or any combination thereof. A sensor 550 may collect and send (wirelessly and/or via wireline) surveillance data 230 comprising sensor data 460 to SDAM 104 for analysis as previously described. Sensor data 560 may be analyzed to identify the effect that ambient conditions may have on human behaviors. SDAM 104 may analyze nuances in human behavior, which may be brought on by various ambient conditions detectible in noise levels, temperature fluctuations, ambient percussive noise and/or the like that may be used to identify behavior patterns and/or predict future behavior. Illustrated in FIG. 5, a sensor 550 may be a microphone and may be disposed on camera 214. Sensor 550 may pick-up audio generating audio sensor data 560 to identify ambient noise conditions and to correlate these to human customer behaviors. Such sensor data 560 may be used by SDAM 104 to identify various features of events occurring within a business such as identifying from ambient noise, a number of customers in the business and/or identifying via a voice signature the identity of a customer present. For example, the voice may be recorded and audio may be analyzed by SDAM 104 to determine what product or service the customer was asking for or providing feedback about.

Sensor data 560 may be monitored to give the SDAM 104 information about context in the business for example by identifying patterns in ambient noise fluctuations to determine correlations to events so that based at least in part on the observed fluctuations in ambient noise, information about what is happening in the business may be determined by SDAM 104. For example, the noise level at a party tends to increase overall just before everyone begins to leave. Similarly, an early morning shopping rush may have a high ambient noise level due to frenetic customers clamoring for last minute items on their way to work. Such information may be used by SDAM 104 to generate information about when certain customers are likely to shop.

Observed patterns in ambient noise levels coupled with context data such as day and time information may allow SDAM 104 to determine particular context within which various customers shop and their reactions to the various contexts may be analyzed and recorded. For example, some customers may buy more goods in a crowded shopping environment than in a slow and uncrowded store. Sensor data 560 that may be mapped to context for a sophisticated understanding of ambient condition effects on customer behavior and may be used by SDAM 104 to predict behavior based on ambient condition effects on the customer's behavior based at least in part on recorded behavior data and recorded ambient conditions. Other sensor data such as ambient temperature readings and/or chemical sensors sensitive to human stress hormones may be monitored in a similar way and such data may be analyzed by SDAM 104 to predict behavior.

Figure 6:
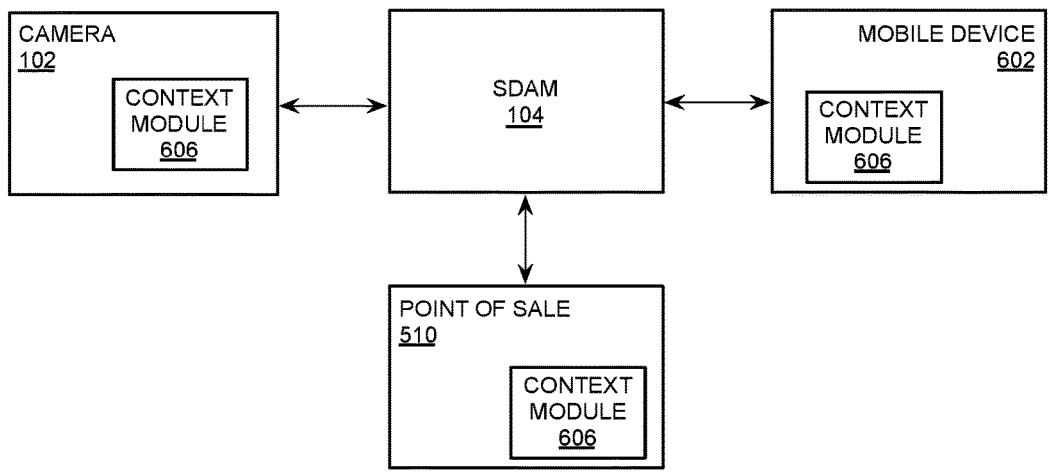
FIG. 6 is a block diagram illustrating an example system for predicting behavior based, at least in part, on surveillance data.

FIG. 6 is a block diagram illustrating an example system for predicting behavior based, at least in part, on surveillance data, in accordance with various embodiments. In one example, system 100 may include a camera 102, SDAM 104, mobile device 602 and POS device 510. Mobile device 602 may be associated with subject 112 in a database accessible to SDAM 104 or in a database stored in storage device 210 in SDAM 104. In an example, one or more of camera 102, mobile device 602, or POS device 510 may comprise a context module 606. Context module 606 may be configured to capturing context data and send context data 526 to SDAM 104 to be analyzed with the surveillance data 108. Context data 526 may include one or more of a device location, a device ID, a time, a date, an item purchased, a type of establishment, weather information, a season, a transaction type, a cost, a product, a service, a duration of visit, a speed, a direction of travel, an entrance, an exit, or a gender, and/or any combination thereof. Context module 606 may receive or generate context data 526 based, at least in part, on any of a variety of sources such as, but not limited to, onboard and/or network resources. Context data 526 may be derived from sensors, global positioning satellite communications, a time keeper, a calendar, a weather forecast service, traffic data service, newsfeed, and the like or any combinations thereof.

In one example, SDAM 104 may be configured to send command 540 to a variety of devices including but not limited to a point of sale device (POS), small-form factor portable (or mobile) electronic device such as a cell phone, a personal data assistant (PDA), a personal media player device, a wireless web-watch device, a personal headset device, an application specific device, a personal computer, laptop, tablet, and a slate device. Any of such devices may be associated with subject 112 in storage device 210. For example, SDAM 104 may send command 540 to POS device 510 triggering POS device 510 to print out coupon 544 to be presented to subject 112 upon purchase of purse 512 and/or command 540 may be sent to mobile device 602 associated with subject 112 triggering mobile device 602 to display an incentive based, at least in part, on prediction data 530.

The present disclosure may have been described with respect to non-limiting examples of POS (e.g., merchant of some type) and/or in the context of a subject, who may be a consumer. However, it is well contemplated within scope and spirit of claimed subject matter that the present disclosure may be described and may be applicable to a wide variety of consumer and/or merchant related applications.

In one example, a supplier of goods and/or services to a merchant, which may provide the goods and/or services to a consumer, may utilize predication data such as, but not limited to, prediction data 530 previously described, to determine supply chain related information for the merchant. For example, for a merchant may utilize prediction data to determine a number of items such as, but not limited to, shoes for a given period of time, for a particular store, for a particular region, for a particular date, for a particular season, etc., and/or any combination thereof. Additionally, prediction data may facilitate determination by a supplier a type of goods and/or services which seem to "move" (e.g., sell and/or be popular) for a given period of time, for a particular store, for a particular region, for a particular date, for a particular season, etc., and/or any combination thereof. For example, based, at least in part, on prediction data, a supplier may determine that a particular brand of shoes may move more than another on particular days of the week, season, weather, time, region, demographic data, particular stores, etc., and/or any combination thereof.

As can be appreciated from the present disclosure, predictive data may be utilized in a wide variety of manners. In another example, a merchant may utilize predictive data to determine ordering of supplies. For example, a merchant may utilize predictive data to determine a number of shoes and/or particular brand of shoes that may move more than another on particular days of the week, season, weather, time, region, demographic data, particular stores, etc., and/or any combination thereof. Accordingly, the merchant may order the particular number of shoes and/or brand of shoes based, at least in part, on predictive data. In turn, the ordering may provide a supplier of the shoes information to facilitate improved efficient supplying of the shoes.

In yet another example, a merchant may be capable of facilitating communication with a consumer to provide information regarding availability of merchandise. For example, a merchant may have capabilities of providing communications to a consumer of when a particular type of shoes may be available at a particular store and/or when a supply of the particular type of shoes may arrive at the particular store. The information may include number of availability of the particular style of shoes. Here again, the information provided to the consumer may be based, at least in part, on predictive data as described herein. Predictive information may be utilized for a wide variety of applications within the scope and spirit of present disclosure, and accordingly, within the scope of the claimed subject matter. Additionally, the predictive information may be utilized as a learning tool. For example, predictive information may facilitate intelligent and/or artificial intelligent learning of a subject (i.e., predictive behavior of a subject at least as described herein).

Figure 7A:
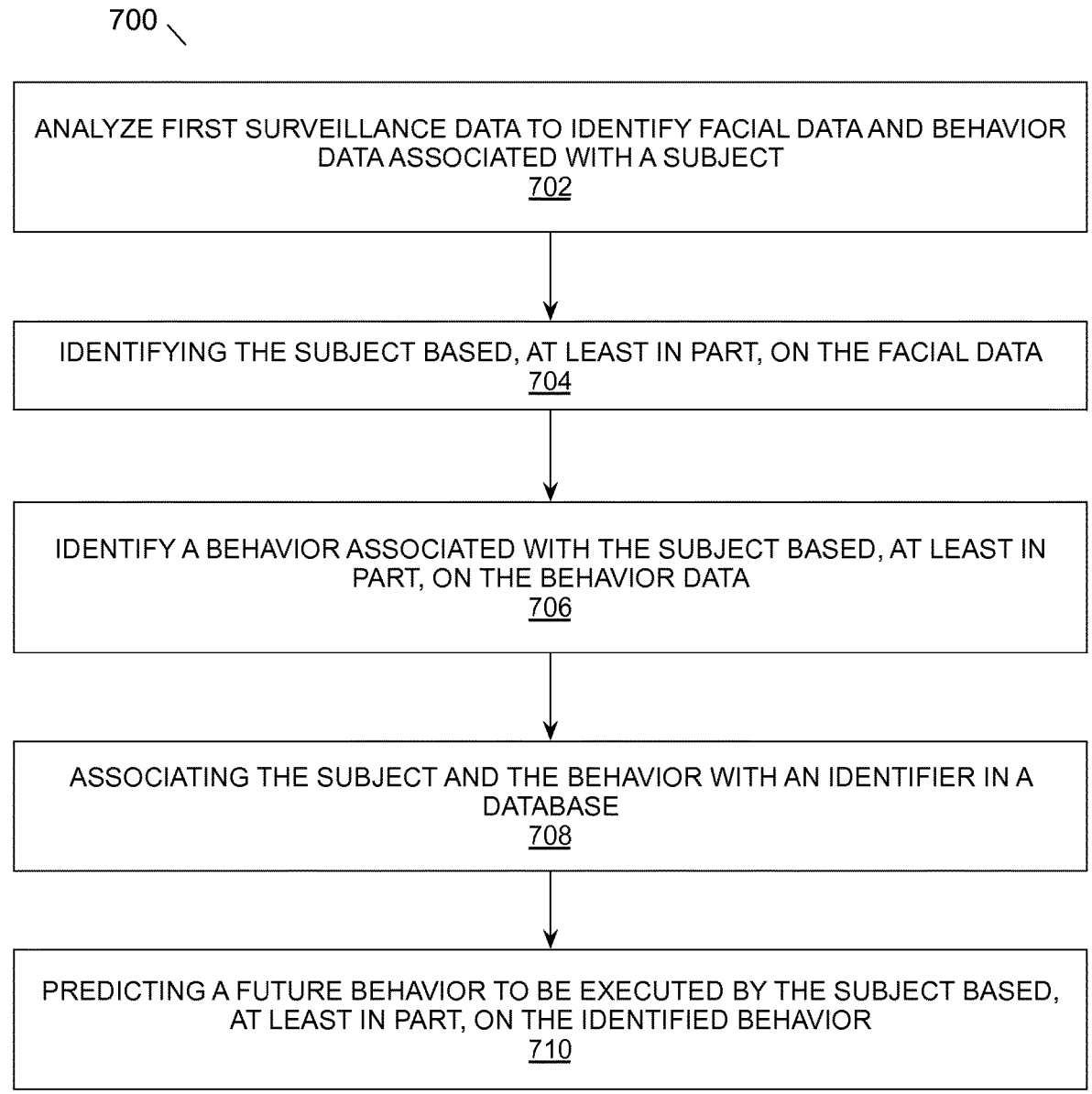
FIG. 7A illustrates an operational flow for predicting behavior based, at least in part, on surveillance data.
Figure 7B:
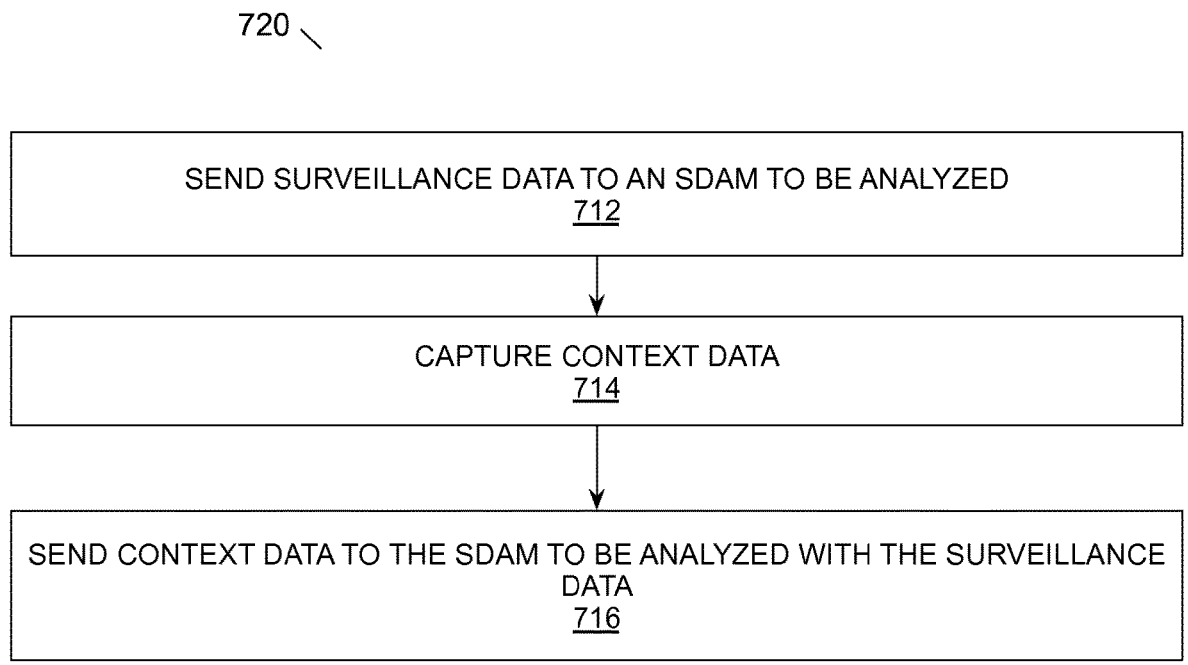
FIG. 7B illustrates an operational flow for predicting behavior based, at least in part, on surveillance data.

FIGS. 7A and 7B illustrate examples of operational flows for predicting behavior based, at least in part, on surveillance data, arranged in accordance with at least some embodiments described herein. In some portions of the description, illustrative implementations of the method may be described with reference to elements of the system 100 depicted in FIGS. 1-6. However, the described embodiments are not limited to these depictions. More specifically, some elements depicted in FIGS. 1-6 may be omitted from some implementations of the methods details herein. Furthermore, other elements not depicted in FIGS. 1-6 may be used to implement example methods detailed herein.

Additionally, FIGS. 7A and 7B employ block diagrams to illustrate the example methods detailed therein. These block diagrams may set out various functional block or actions that may be described as processing steps, functional operations, events and/or acts, etc., and may be performed by hardware, software, and/or firmware. Numerous alternatives to the functional blocks detailed may be practiced in various implementations. For example, intervening actions not shown in the figures and/or additional actions not shown in the figures may be employed and/or some of the actions shown in one figure may be operated using techniques discussed with respect to another figure. Additionally, in some examples, the actions shown in these figures may be operated using parallel processing techniques. The above described, and other not described, rearrangements, substitutions, changes, modifications, etc., may be made without departing from the scope of the claimed subject matter.

In FIG. 7A, in some examples, operational flow 700 may be employed as part of a system for predicting behavior based, at least in part, on surveillance data. Beginning at block 702 ("Analyze First Surveillance Data To Identify Facial Data And Behavior Data Associated With A Subject"), the SDAM 104 (shown in FIG. 1) may receive surveillance data 108 comprising video image data and/or audio data. The surveillance data 108 may be received from one or more devices capable of capturing video image data and/or audio data, such as camera 102, camera 212 and/or camera 214. SDAM 104 may perform analytics on the surveillance data 108 to identify facial data 114 and behavior data 116 associated with a subject 112.

Continuing from block 702 to 704 ("Identifying The Subject Based, at least in part, On The Facial Data"), the SDAM 104 may perform analytics on surveillance data 108 to identify subject 112 based, at least in part, on the facial data 114. A variety of facial recognition techniques may be used to identify the subject 112. Audio analysis may be used to identify subject 112 as well.

Continuing from block 704 to 706 ("Identify A Behavior Associated With The Subject Based, at least in part, On The Behavior Data"), the SDAM 104 may perform analytics to identify behavior associated with the subject 112. Behaviors such as making a purchase, entering a store, leaving a store, browsing merchandise, playing a video game, eating, gambling, exercising, working, and the like may be inferred from an analysis of motions executed by a subject in surveillance data 108. In one example, the motions recorded may be correlated with audio data and/or contextual factors to make such inferences. The behavior identified may be associated with the subject 112 and/or subject identifier 330 in a database. Each behavior entry may be associated with context data and/or supplemental data that adds information about the behavior such as, but not limited to, a length of time executing the behavior, frequency of the behavior, heat generated during activity, volume of activity, limbs involved, posture, or the like, and/or any combination thereof. In one example, behaviors may be identified using a variety of VCA techniques. For example, possible behaviors may be predetermined and identifiable based, at least in part, on a range of motions generally characteristic of the predetermined behavior. In an example, the behavior 'making a purchase' may be identified based, at least in part, on motion at a POS device 510. Context data 526 may be sent from POS device 510 and may be compared to behavior data to confirm that the behavior should be identified as 'making a purchase.' In another example, behaviors may be associated with facial data 114 based, at least in part, on motion analysis and an inferred connection between the body executing the motions and facial data 114. SDAM 104 may include a database identifying motions characteristic of the predetermined behaviors. SDAM 104 may be configured to map motions recorded in the surveillance data 108 to one or more of the predetermined behaviors.

Continuing from block 706 to 708 ("Associating The Subject And The Behavior With An Identifier In A Database"), SDAM 104 may associate the subject 112 and/or the behavior with an identifier in a database. Continuing from block 708 to 710 ("Predicting A Future Behavior To Be Executed By The Subject Based, at least in part, On The Identified Behavior"), SDAM 104 may predict a future behavior to be executed by the subject 112 based, at least in part, on the identified behavior.

In FIG. 7B, in some examples, operational flow 720 may be employed as part of a system for predicting behavior based, at least in part, on surveillance data. Beginning at block 712 ("Send Surveillance Data To An SDAM To Be Analyzed"), a device configured to record video and/or audio, for example, camera 102 may send surveillance data to SDAM 104 to be analyzed, wherein the surveillance data may comprise facial data and behavior data. Continuing from block 712 to 714 ("Capture Context Data), camera 102 may comprise a context module 606 configured to capture context data from any of a variety of sources such as an onboard and/or network resources such as a time keeper, a calendar, a weather forecast service, traffic data service, global positioning service, newsfeed, and the like or any combinations thereof. Continuing from block 714 to 716 ("Send Context Data To The SDAM To Be Analyzed With The Surveillance Data") camera 102 may be configured to send context data to SDAM 104 to be analyzed with the surveillance data to identify a subject and behavior patterns associated with the subject and to predict future behavior patterns based, at least in part, on the context and surveillance data.

In general, the operational flow described with respect to FIGS. 7A and 7B and elsewhere herein may be implemented as a computer program product, executable on any suitable computing system, or the like. For example, a computer program product for facilitating visual analysis of transactions utilizing analytics may be provided. Example computer program products are described with respect to FIG. 8 and elsewhere herein.

FIG. 8 illustrates an example computer program product 800, arranged in accordance with at least some embodiments described herein. Computer program product 800 may include machine readable non-transitory medium having stored therein instructions that, when executed, cause the machine to facilitate prediction of behavior based, at least in part, on analysis of surveillance data according to the processes and methods discussed herein. Computer program product 800 may include a signal bearing medium 802. Signal bearing medium 802 may include one or more machine-readable instructions 804, which, when executed by one or more processors, may operatively enable a computing device to provide the functionality described herein. In various examples, some or all of the machine-readable instructions may be used by the devices discussed herein.

In some examples, the machine readable instructions 804 may include analyzing first surveillance data comprising video image data to identify facial data and behavior data associated with a subject. In some examples, the machine readable instructions 804 may include identifying the subject based, at least in part, on the facial data. In some examples, the machine readable instructions 804 may include identifying a behavior associated with the subject based, at least in part, on the behavior data. In some examples, the machine readable instructions 804 may include associating the subject and the behavior with an identifier in a database. In some examples, the machine readable instructions 804 may include predicting a future behavior to be executed by the subject based, at least in part, on the identified behavior.

In some implementations, signal bearing medium 802 may encompass a computer-readable medium 806, such as, but not limited to, a hard disk drive, a Compact Disc (CD), a Digital Versatile Disk (DVD), a digital tape, memory, etc. In some implementations, the signal bearing medium 802 may encompass a recordable medium 808, such as, but not limited to, memory, read/write (R/W) CDs, R/W DVDs, etc. In some implementations, the signal bearing medium 802 may encompass a communications medium 810, such as, but not limited to, a digital and/or an analog communication medium (e.g., a fiber optic cable, a waveguide, a wired communication link, a wireless communication link, etc.). In some examples, the signal bearing medium 802 may encompass a machine readable non-transitory medium.

Figure 9:
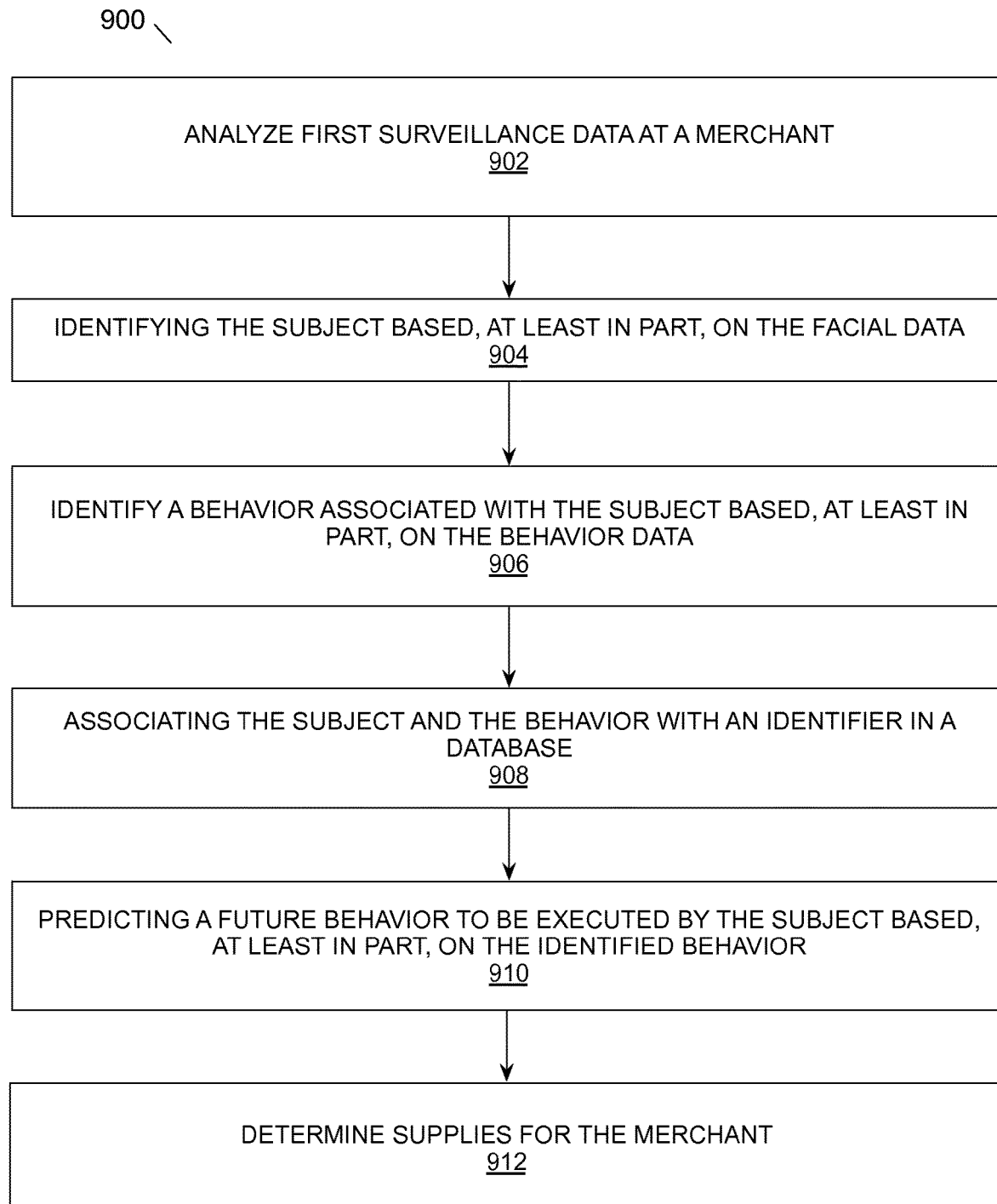
FIG. 9 illustrates an example operational flow for utilization of predictive behavior base, at least in part, on surveillance data, arranged in accordance with at least some embodiments described herein.

FIG. 9 illustrates an example operational flow for utilization of predictive behavior base, at least in part, on surveillance data, arranged in accordance with at least some embodiments described herein. In some portions of the description, illustrative implementations of the method may be described with reference to elements of the system 100 depicted in FIGS. 1-6. However, the described embodiments are not limited to these depictions. More specifically, some elements depicted in FIGS. 1-6 may be omitted from some implementations of the method details herein. Furthermore, other elements not depicted in FIGS. 1-6, may be used to implement example methods detailed herein.

Additionally, FIG. 9 employ block diagrams to illustrate the example methods detailed therein. The block diagram may set out various functional block or actions that may be described as processing steps, functional operations, events and/or acts, etc., and may be performed by hardware, software, and/or firmware. Numerous alternatives to the functional blocks detailed may be practiced in various implementations. For example, intervening actions not shown in the figures and/or additional actions not shown in the figures may be employed and/or some of the actions shown in one figure may be operated using techniques discussed with respect to another figure. Additionally, in some examples, the actions shown in these figures may be operated using parallel processing techniques. The above described, and other not described, rearrangements, substitutions, changes, modifications, etc., may be made without departing from the scope of the claimed subject matter.

In FIG. 9, in some examples, operational flow 900 may be employed as part of a system for determining supplies for a merchant based, at least in part, on predicting behavior based, at least in part, on surveillance data. Beginning at block 902 ("Analyze First Surveillance Data At A Merchant"), the SDAM 104 (shown in FIG. 1) may receive surveillance data 108 comprising video image data, audio, and/or sensor data. The surveillance data 108 may be received from one or more devices capable of capturing video image data, audio data, and/or sensor data, such as camera 102, camera 212 and/or camera 214. SDAM 104 may perform analytics on the surveillance data 108 to identify facial data 114 and behavior data 116 associated with a subject 112 visiting a merchant, where the merchant may have POS devices 310, 410, and 510 as previously described.

Continuing from block 902 to 904 ("Identifying The Subject Based, at least in part, On The Facial Data"), the SDAM 104 may perform analytics on surveillance data 108 to identify subject 112 based, at least in part, on the facial data 114. The facial data may be available to the merchant. A variety of facial recognition techniques may be used to identify the subject 112. Audio analysis may be used to identify subject 112 as well.

Continuing from block 904 to 906 ("Identify A Behavior Associated With The Subject Based, at least in part, On The Behavior Data"), the SDAM 104 may perform analytics to identify behavior associated with the subject 112 while the subject may be visiting the merchant. Behaviors such as making a purchase, entering a store, leaving a store, browsing merchandise, playing a video game, eating, gambling, exercising, working, and the like may be inferred from an analysis of motions executed by a subject in surveillance data 108. In one example, the motions recorded may be correlated with audio data and/or contextual factors to make such inferences. The behavior identified may be associated with the subject 112 and/or subject identifier 330 in a database. Each behavior entry may be associated with context data and/or supplemental data that adds information about the behavior such as, but not limited to, a length of time executing the behavior, frequency of the behavior, heat generated during activity, volume of activity, limbs involved, posture, or the like, and/or any combination thereof. In one example, behaviors may be identified using a variety of VCA techniques. For example, possible behaviors may be predetermined and identifiable based, at least in part, on a range of motions generally characteristic of the predetermined behavior. In an example, the behavior 'making a purchase' may be identified based, at least in part, on motion at a POS device 510. Context data 526 may be sent from POS device 510 and may be compared to behavior data to confirm that the behavior should be identified as 'making a purchase.' In another example, behaviors may be associated with facial data 114 based, at least in part, on motion analysis and an inferred connection between the body executing the motions and facial data 114. SDAM 104 may include a database identifying motions characteristic of the predetermined behaviors. SDAM 104 may be configured to map motions recorded in the surveillance data 108 to one or more of the predetermined behaviors.

Continuing from block 906 to 908 ("Associating The Subject And The Behavior With An Identifier In A Database"), SDAM 104 may associate the subject 112 and/or the behavior with an identifier in a database. The database may be available to the merchant. Continuing from block 908 to 910 ("Predicting A Future Behavior To Be Executed By The Subject Based, at least in part, On The Identified Behavior"), SDAM 104 may predict a future behavior to be executed by the subject 112 based, at least in part, on the identified behavior as previously described.

Continuing from block 910 to 912 ("Determining Supplies For The Merchant"), the merchant and/or a supplier to the merchant may determine supplies (e.g., merchandise of some kind such as, but not limited to, shoes, coffee, coffee cups, purse, etc.). Determining supplies for the merchant may be based, at least in part, on the predicted future behavior to be executed by the subject while visiting the merchant. Predicted future behavior to be executed by the subject may facilitate a merchant and/or a supplier to determine a type of goods and/or services which may move (e.g., sell and/or be popular) for a given period of time, for a particular store, for a particular region, for a particular date, for a particular season, etc., and/or any combination thereof. For example, based, at least in part, on prediction data, a merchant and/or a supplier may determine that a particular brand of shoes may move more than another on particular days of the week, season, weather, time, region, demographic data, particular stores, etc., and/or any combination thereof.

In general, the operational flow described with respect to FIG. 9 and elsewhere herein may be implemented as a computer program product, executable on any suitable computing system, or the like. For example, a computer program product for facilitating intelligent visual analysis of transactions utilizing analytics may be provided. Example computer program products are described with respect to FIG. 10 and elsewhere herein.

FIG. 10 illustrates an example computer program product 1000, arranged in accordance with at least some embodiments described herein. Computer program product 1000 may include machine readable non-transitory medium having stored therein instructions that, when executed, cause the machine to facilitate prediction of behavior based, at least in part, on analysis of surveillance data according to the processes and methods discussed herein. Computer program product 1000 may include a signal bearing medium 1002. Signal bearing medium 1002 may include one or more machine-readable instructions 1004, which, when executed by one or more processors, may operatively enable a computing device to provide the functionality described herein. In various examples, some or all of the machine-readable instructions may be used by the devices discussed herein.

In some examples, the machine readable instructions 1004 may include analyzing first surveillance data at a merchant, the first surveillance data including video image data to facilitate identification of facial data and behavior data associated with a subject visiting the merchant. In some examples, the machine readable instructions 1004 may include identifying the subject based, at least in part, on the facial data, the facial data being available to the merchant. In some examples, the machine readable instructions 1004 may include identifying a behavior associated with the subject based, at least in part, on the behavior data while visiting the merchant. In some examples, the machine readable instructions 1004 may include associating the subject and the behavior with an identifier in a database, the database being available to the merchant. In some examples, the machine readable instructions 1004 may include predicting a future behavior to be executed by the subject based, at least in part, on the identified behavior. In some examples, the machine readable instructions 1004 may include determining supplies for the merchant based, at least in part, on the predicted future behavior to be executed by the subject while visiting the merchant.

In some implementations, signal bearing medium 1002 may encompass a computer-readable medium 1006, such as, but not limited to, a hard disk drive, a Compact Disc (CD), a Digital Versatile Disk (DVD), a digital tape, memory, etc. In some implementations, the signal bearing medium 1002 may encompass a recordable medium 1008, such as, but not limited to, memory, read/write (R/W) CDs, R/W DVDs, etc. In some implementations, the signal bearing medium 1002 may encompass a communications medium 1010, such as, but not limited to, a digital and/or an analog communication medium (e.g., a fiber optic cable, a waveguide, a wired communication link, a wireless communication link, etc.). In some examples, the signal bearing medium 1002 may encompass a machine readable non-transitory medium.

In general, the methods described with respect to FIGS. 7A, 7B, 9, and elsewhere herein may be implemented in any suitable computing system. Example systems may be described with respect to FIG. 11 and elsewhere herein. In general, the system may be configured to facilitate intelligent visual analysis of transactions utilizing analytics.

Figure 11:
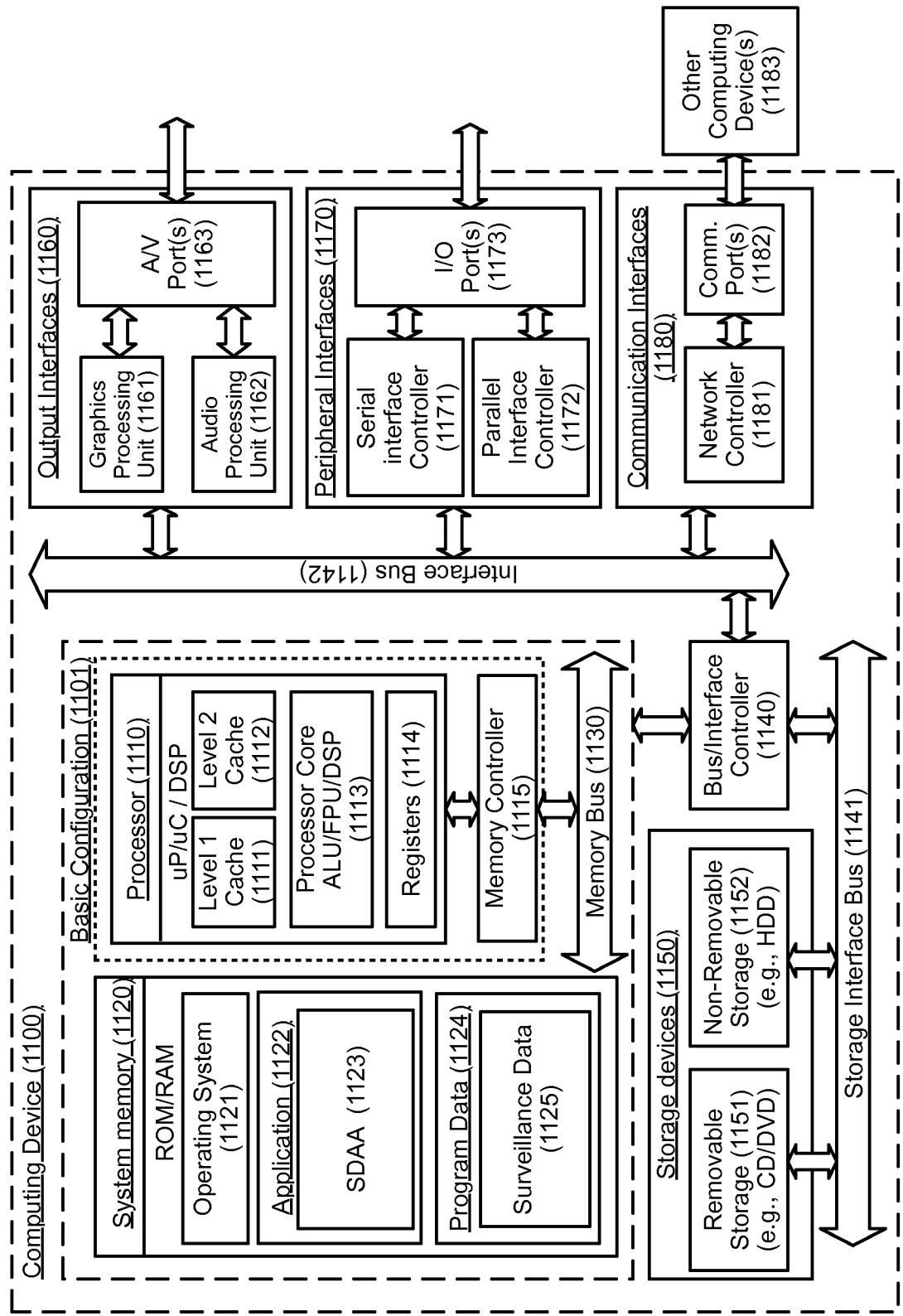
FIG. 11 is an illustration of a block diagram of an example computing device, all arranged in accordance with at least some embodiments described herein.

FIG. 11 is a block diagram illustrating an example computing device 1100, such as might be embodied by a person skilled in the art, which is arranged in accordance with at least some embodiments of the present disclosure. In one example configuration 1101, computing device 1100 may include one or more processors 1110 and system memory 1120. A memory bus 1130 may be used for communicating between the processor 1110 and the system memory 1120.

Depending on the desired configuration, processor 1110 may be of any type including but not limited to a microprocessor (µP), a microcontroller (µC), a digital signal processor (DSP), or any combination thereof. Processor 1110 may include one or more levels of caching, such as a level one cache 1111 and a level two cache 1112, a processor core 1113, and registers 1114. The processor core 1113 may include an arithmetic logic unit (ALU), a floating point unit (FPU), a digital signal processing core (DSP Core), or any combination thereof. A memory controller 1115 may also be used with the processor 1110, or in some implementations the memory controller 1115 may be an internal part of the processor 1110.

Depending on the desired configuration, the system memory 1120 may be of any type including but not limited to volatile memory (such as RAM), non-volatile memory (such as ROM, flash memory, etc.) or any combination thereof. System memory 1120 may include an operating system 1121, one or more applications 1122, and program data 1124. Application 1122 may include surveillance data analysis algorithm (SDAA) 1123 that may be arranged to perform the functions as described herein including the functional blocks and/or actions described. Program Data 1124 may include surveillance data 1125 for use with SDAA 1123. In some example embodiments, application 1122 may be arranged to operate with program data 1124 on an operating system 1121 such that implementations of facilitating predicting future behavior utilizing surveillance content analytics may be provided as described herein. For example, apparatus described in the present disclosure may comprise all or a portion of computing device 1100 and be capable of performing all or a portion of application 1122 such that implementations of facilitating predicting future behavior utilizing surveillance content analytics may be provided as described herein. This described basic configuration may be illustrated in FIG. 11 by those components within dashed line 1101. As described herein, surveillance data may include a wide variety of surveillance data such as, but not limited to, sensor data, sound, temperature, video, olfactory, lighting, vibrational, electrical, etc., and/or any combination thereof.

Computing device 1100 may have additional features or functionality, and additional interfaces to facilitate communications between the basic configuration 1101 and any required devices and interfaces. For example, a bus/interface controller 1140 may be used to facilitate communications between the basic configuration 1101 and one or more data storage devices 1150 via a storage interface bus 1141. The data storage devices 1150 may be removable storage devices 1151, non-removable storage devices 1152, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 1120, removable storage 1151 and non-removable storage 1152 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 1100. Any such computer storage media may be part of device 1100.

Computing device 1100 may also include an interface bus 1142 for facilitating communication from various interface devices (e.g., output interfaces, peripheral interfaces, and communication interfaces) to the basic configuration 1101 via the bus/interface controller 1140. Example output interfaces 1160 may include a graphics processing unit 1161 and an audio processing unit 1162, which may be configured to communicate to various external devices such as a display or speakers via one or more A/V ports 1163. Example peripheral interfaces 1170 may include a serial interface controller 1171 or a parallel interface controller 1172, which may be configured to communicate with external devices such as input devices (e.g., keyboard, mouse, pen, voice input device, touch input device, etc.) or other peripheral devices (e.g., printer, scanner, etc.) via one or more I/O ports 1173. An example communication interface 1180 includes a network controller 1181, which may be arranged to facilitate communications with one or more other computing devices 1183 over a network communication via one or more communication ports 1182. A communication connection is one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared (IR) and other wireless media. The term computer readable media as used herein may include both storage media and communication media.

Computing device 1100 may be implemented as a portion of a small-form factor portable (or mobile) electronic device such as a cell phone, a personal data assistant (PDA), a personal media player device, a wireless web-watch device, a personal headset device, an application specific device, or a hybrid device that includes any of the above functions. Computing device 1100 may also be implemented as a personal computer including both laptop computer and non-laptop computer configurations. In addition, computing device 1100 may be implemented as part of a wireless base station or other wireless system or device.

Some portions of the foregoing detailed description are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing device, that manipulates or transforms data represented as physical electronic or magnetic quantities within memories, registers, or other information storage devices, transmission devices, or display devices of the computing device.

Claimed subject matter is not limited in scope to the particular implementations described herein. For example, some implementations may be in hardware, such as employed to operate on a device or combination of devices, for example, whereas other implementations may be in software and/or firmware. Likewise, although claimed subject matter is not limited in scope in this respect, some implementations may include one or more articles, such as a signal bearing medium, a storage medium and/or storage media. This storage media, such as CD-ROMs, computer disks, flash memory, or the like, for example, may have instructions stored thereon, that, when executed by a computing device, such as a computing system, computing platform, or other system, for example, may result in execution of a processor in accordance with claimed subject matter, such as one of the implementations previously described, for example. As one possibility, a computing device may include one or more processing units or processors, one or more input/output devices, such as a display, a keyboard and/or a mouse, and one or more memories, such as static random access memory, dynamic random access memory, flash memory, and/or a hard drive.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a flexible disk, a hard disk drive (HDD), a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Reference in the specification to "an implementation," "one implementation," "some implementations," or "other implementations" may mean that a particular feature, structure, or characteristic described in connection with one or more implementations may be included in at least some implementations, but not necessarily in all implementations. The various appearances of "an implementation," "one implementation," or "some implementations" in the preceding description are not necessarily all referring to the same implementations.

While certain exemplary techniques have been described and shown herein using various methods and systems, it should be understood by those skilled in the art that various other modifications may be made, and equivalents may be substituted, without departing from claimed subject matter.

Additionally, many modifications may be made to adapt a particular situation to the teachings of claimed subject matter without departing from the central concept described herein. Therefore, it is intended that claimed subject matter not be limited to the particular examples disclosed, but that such claimed subject matter also may include all implementations falling within the scope of the appended claims, and equivalents thereof.

What is claimed:

1. A method for operating a Point of Sale (POS) system, the method comprising:
   receiving, by a processor, video data of a subject from a camera;
   identifying, by the processor, the subject as an identified subject based, at least in part, on performing a facial recognition on the video data received;
   identifying, by the processor, a behavior associated with the subject from the video data, wherein the identifying of the behavior is based, at least in part, on a pattern of behaviors stored in a database;
   receiving, by the processor, context data from the POS system, wherein the context data is associated with the subject;
   storing, by the processor, an association of the identified subject with the behavior and the context data in the database;
   predicting, by the processor, a future behavior to be executed by the subject, wherein the future behavior is predicted based, at least in part, on the association; and
   causing, by the processor, the POS system to print a coupon that contains a promotion that is determined based, at least in part, on the future behavior predicted and the context data received from the POS system, the coupon configured to be usable during a subsequent context data, the subsequent context data being substantially similar to the context data received from the POS.

2. The method of claim 1, wherein the video data of the subject is received from a plurality of cameras.

3. The method of claim 2, wherein the plurality of cameras are located in at least two different geographic locations.

4. The method of claim 2, further comprising identifying a particular pattern of behavior executed by the subject based, at least in part, on the association stored in the database.

5. The method of claim 4, wherein identifying the pattern of behavior further comprises:
   identifying a first action type executed by the subject in the video data received;
   associating the first action type with the subject;
   identifying a second action type executed by the subject in the video data received;
   associating the second action type with the subject; and
   correlating the first action type with the second action type in association with the subject.

6. The method of claim 5, wherein predicting the future behavior, further comprises:
   recognizing the subject based, at least in part, on facial data in a subsequent received video image data of the subject;
   identifying execution of the first action type by the subject; and
   predicting execution of the second action type by the subject based, at least in part, on execution of the first action type.

7. The method of claim 4, wherein identifying the pattern of behavior comprises:
   identifying a first context data in the video data received;
   associating the first context data with the subject;
   identifying a second context data in the video data received;
   associating the second context data with the subject; and
   correlating the first context data with the second context data in association with the subject.

8. The method of claim 7, wherein predicting the future behavior, further comprises:
   recognizing the subject based, at least in part, on facial data in a subsequent received video image data of the subject;
   determining that the subject is present in the first context data; and
   predicting that the subject will be present in the second context data based, at least in part, on presence in the first context data.

9. The method of claim 1, wherein the context data comprises at least one of a time, a date, an item purchased, a type of establishment, weather information, a season, a transaction type, a cost, a product, a service, a duration of visit, an entrance, an exit, or a gender, or any combinations thereof.

10. The method of claim 1, further comprising:
    identifying a communication method associated with the subject based, at least in part, on the identity of the identified subject; and
    sending the coupon to the subject via the communication method.

11. The method of claim 1, wherein the video data includes audio data and the behavior is identified in part based on tho the audio data.

12. An apparatus for operating a Point of Sale (POS) system, the apparatus comprising:
    a communication interface that is communicatively coupled to a camera and the POS system;
    a database; and
    a processor that is communicatively coupled to the communication interface and the database, wherein the processor is configured to:
       receive, using the communication interface, video data of a subject from the camera,
       identify, using the database, the subject as an identified subject based, at least in part, on performing a facial recognition on the video data received,
       identify, using the database, a behavior associated with the subject from the video data, where the behavior is identified based, at least in part, on a pattern of behaviors stored in the database,
       receive, using the communication interface, context data from the POS system, wherein the context data is associated with the subject;
       store, using the database, an association of the identified subject with the behavior and the context data,
       identify, using the database, the pattern of behavior associated with the subject based at least in part on the association,
       predict, using the database, a future behavior to be executed by the subject, wherein the future behavior is predicted based, at least in part, on the pattern of behavior, and
       cause, using the communication interface, the POS system to print a coupon that contains a promotion that is determined based, at least in part, on the future behavior predicted and the context data received from the POS system, the coupon configured to be usable during a subsequent context data, the subsequent context data being substantially similar to the context data from the POS.

13. The apparatus of claim 12, wherein the video data is received from a plurality of cameras, wherein the video data is captured during a first time period.

14. The apparatus of claim 13, wherein the plurality of cameras are in at least two different locations.

15. The apparatus of claim 12, wherein the processor further identifies a particular pattern of behavior of the subject based in part on spatial events and/or audio events performed by the subject.

16. The apparatus of claim 12, wherein the context data comprises at least one of a time, a date, an item purchased, a type of establishment, weather information, a season, a transaction type, a cost, a product, a service, a duration of visit, an entrance, an exit, or a gender, or any combinations thereof.

17. The apparatus of claim 12, wherein the processor is further configured to:
identify a device associated with the subject; and
send the device the coupon.

18. The apparatus of claim 12, wherein the processor is further configured to:
identify a communication method associated with the subject based, at least in part, on an identity of the identified subject; and
send the coupon to the subject via the communication method.

19. The apparatus of claim 12, wherein to identify the pattern of behavior, the processor is further configured to:
identify a first action type executed by the subject in the video data received;
associate the first action type with the subject;
identify a second action type executed by the subject in the video data received;
associate the second action type with the subject; and
correlate the first action type with the second action type in association with the subject.

20. The apparatus of claim 19, wherein to predict the future behavior, the processor is further configured to:
recognize the subject based, at least in part, on facial data in a subsequently received video image data wherein the subsequently received video image data is captured at a second time period;
identify execution of the first action type by the subject; and
predict execution of the second action type by the subject based, at least in part, on execution of the first action type.

21. The apparatus of claim 12, wherein to identify the pattern of behavior, the processor is further configured to:
identify a first context data in the video data received;
associate the first context data with the identified subject;
identify a second context data in the video data received;
associate the second context data with the subject; and
correlate the first context data with the second context data in association with the subject.

22. The apparatus of claim 21, wherein to predict the future behavior, the processor is further configured to:
recognize the subject based, at least in part, on facial data in a subsequently received video image data;
determine that the subject is present in the first context data; and
predict that the subject will be present in the second context data based, at least in part, on presence in the first context data.

23. A non-transitory machine readable medium having stored therein instructions for operating a Point of Sale (POS) system, the instructions when executed by a processors, cause the processor to execute a method comprising:
receiving, by the processor, video data of a subject from a camera;
identifying, by the processor, the subject as an identified subject based, at least in part, on performing a facial recognition on the video data received;
identifying, by the processor, a behavior associated with the subject from the video data, wherein the identifying of the behavior is based, at least in part, on a pattern of behaviors stored in a database;
receiving, by the processor, context data from the POS system, wherein the context data is associated with the subject;
storing, by the processor, and an association of the identified subject with the behavior and the context data in the database;
predicting, by the processor, a future behavior to be executed by the subject, wherein the future behavior is predicted based, at least in part, on the association;
receiving, by the processor, an indication from the POS system that the subject has engaged in a transaction; and
causing, by the processor, the POS system to print a coupon that contains a promotion that is determined based, at least in part, on the future behavior predicted and the context data received from the POS system, the coupon configured to be usable during a subsequent context data, the subsequent context data being substantially similar to the context data received from the POS.

24. A method for determining supplies for a merchant, the method comprising:
analyzing first surveillance data at the merchant, the first surveillance data including video data of a subject;
identifying the subject as an identified subject based, at least in part, on performing a facial recognition on the video data;
identifying a behavior associated with the subject from the video data, wherein the identifying of the behavior is based, at least in part, on a pattern of behaviors of customers visiting the merchant that are stored in a database;
receiving context data from a Point of Sale (POS) system of the merchant, wherein the context data is associated a supply level of the merchant;
storing an association of the subject and the behavior with an identifier in the database;
predicting a future behavior to be executed by the subject based, at least in part, on the behavior identified; and
causing the POS system to print a coupon that contains a promotion that is determined based, at least in part, on the future behavior predicted and the context data received from the POS system, the coupon configured to be usable during a subsequent context data, the subsequent context data being substantially similar to the context data received from the POS.

* * * * *